No. 747,429. PATENTED DEC. 22, 1903.
W. HUPCHEN.
HEATING, STRAINING, OR FILTERING AND CIRCULATING LIQUIDS.
APPLICATION FILED MAR. 16, 1903.
NO MODEL. 2 SHEETS—SHEET 1.
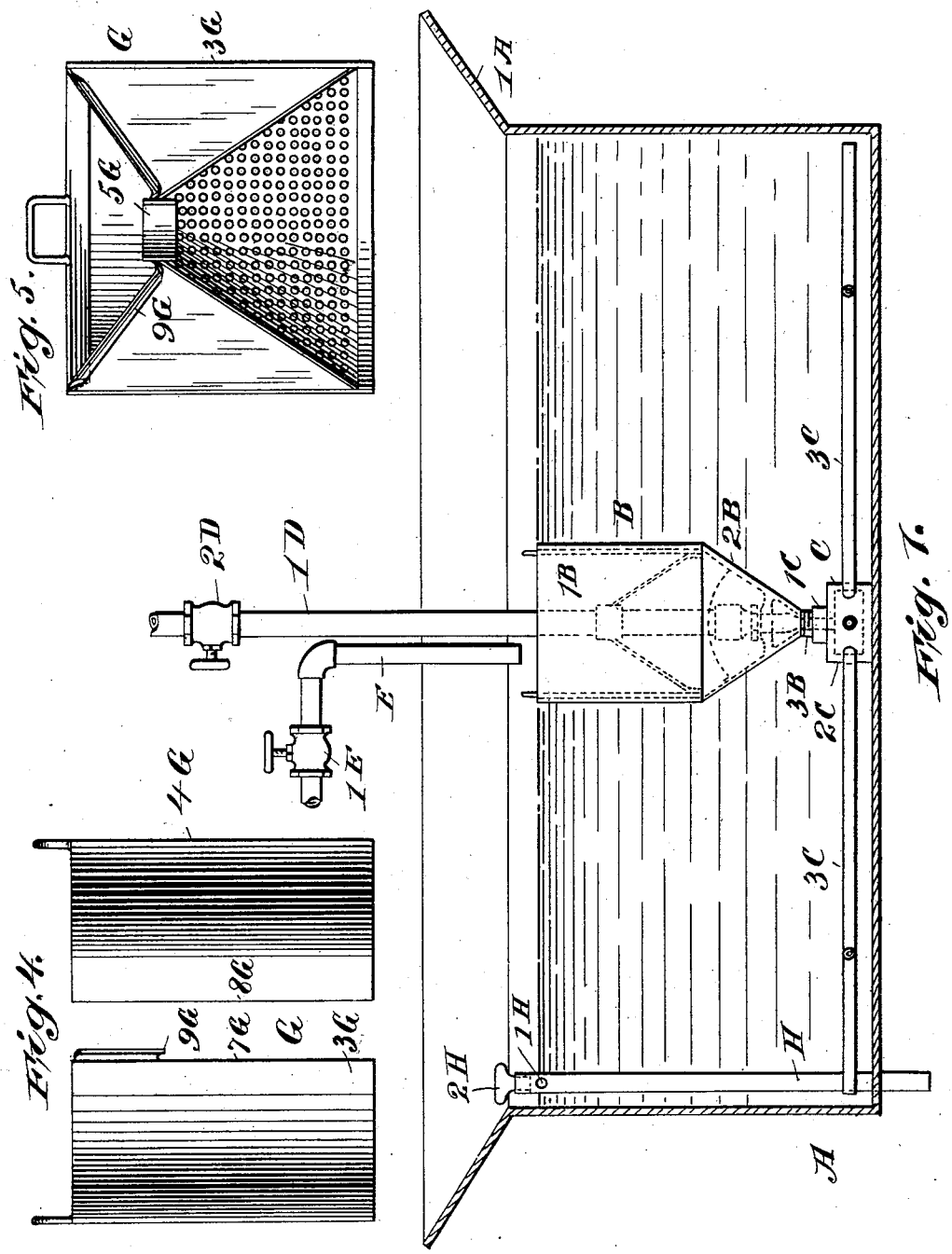

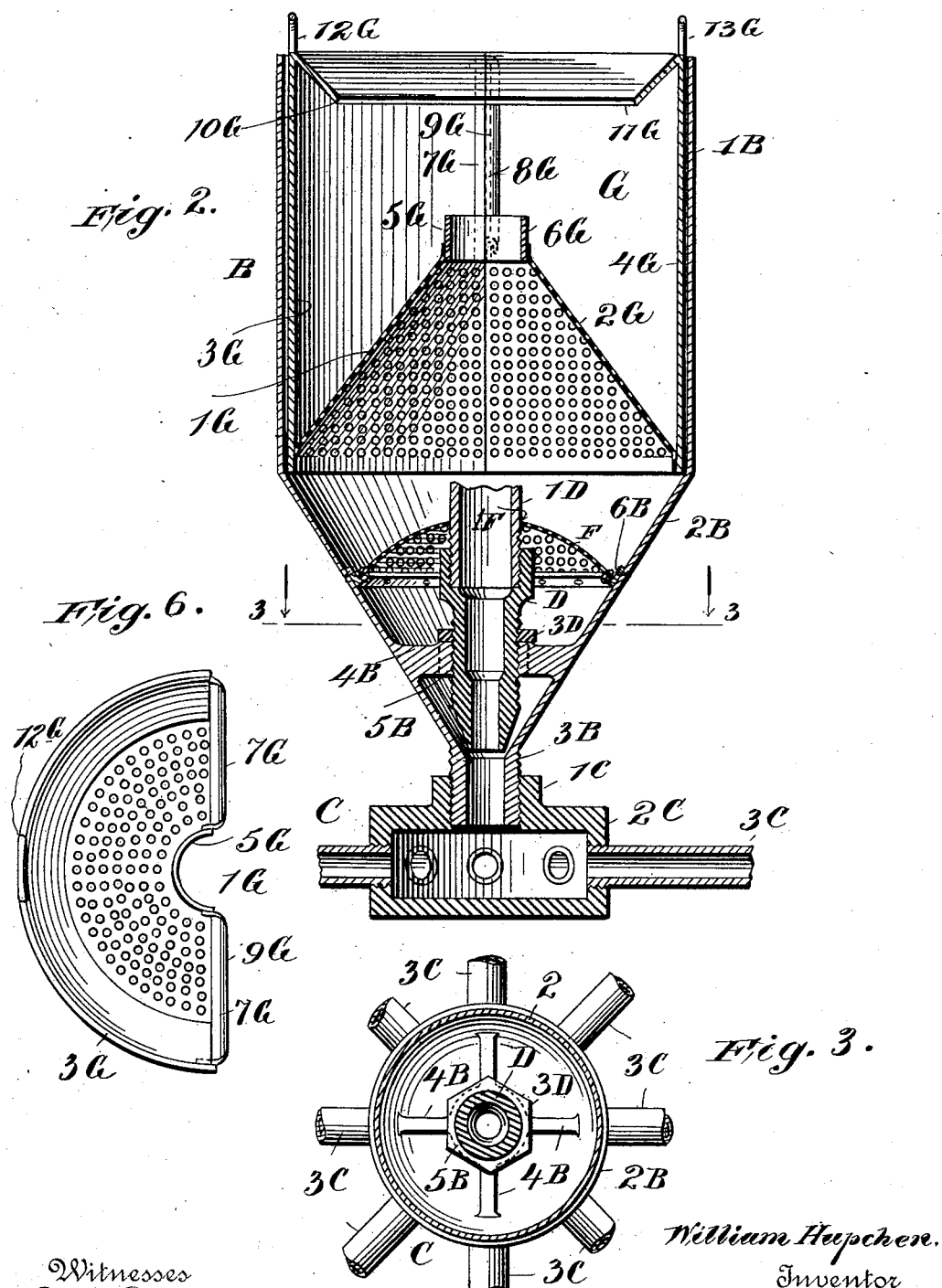

No. 747,429.

Patented December 22, 1903.

UNITED STATES PATENT OFFICE.

WILLIAM HUPCHEN, OF NEW YORK, N. Y., ASSIGNOR OF FIFTY ONE-HUNDREDTHS TO SAMUEL MUNDHEIM, OF NEW YORK, N. Y.

HEATING, STRAINING OR FILTERING, AND CIRCULATING LIQUIDS.

SPECIFICATION forming part of Letters Patent No. 747,429, dated December 22, 1903.

Application filed March 16, 1903. Serial No. 147,929. (No model.)

*To all whom it may concern:*

Be it known that I, WILLIAM HUPCHEN, a citizen of the United States, and a resident of the city of New York, borough of Brooklyn, county of Kings, and State of New York, have invented a certain new and useful Means for Heating, Straining or Filtering, and Circulating Liquids, of which the following is a specification.

While my invention may be applied to a variety of purposes, it is more particularly designed for use in making felt hats. It is the common practice in this art to dip the mat in a tank of very hot water, and then the mat is removed for rolling, this rolling and dipping being repeated alternately for some hours. When the mat is first dipped into this tank, the loose material, known as "pod-gum" fur and hair, leaves the mat and rises to the surface of the water, where it remains, although it does to some extent adhere to the mat when it is withdrawn from the water, and by this adhesion the mat is disfigured or injured.

The object of my invention is to provide a means whereby all this objectionable fur and hair may be easily and economically removed from the surface of the liquid, so that the mat may be withdrawn from the tank without injury. This object I accomplish by providing means in the tank for drawing the surface liquid inwardly and then downwardly through strainers, where the impurities are caught, and then the liquid is passed to the lower edge of the tank, from whence it may return to the surface. While this circulation and filtration may be brought about by any suitable means, I prefer to use an inspirator because it keeps the liquid hot, as well as in circulation.

For a more particular description of one embodiment of my invention reference is to be had to the accompanying drawings, forming a part hereof, in which—

Figure 1 is a sectional view of a tank with a straining or filtering and circulating means centrally located therein. Fig. 2 is an enlarged sectional view of the filtering and circulating means. Fig. 3 is a sectional view taken on the line 3 3 of Fig. 2 looking in the direction of the arrows. Fig. 4 is a side elevation of two separate parts of a strainer or filter. Fig. 5 is a view taken at right angles to Fig. 4, one part only being shown. Fig. 6 is a plan view of the strainer or filter shown in Fig. 5.

Throughout the various views similar reference characters designate similar parts.

The tank A may be of any suitable shape and is preferably provided with a flange $1^A$, on which the mat may be rolled, and is also provided with a drain and overflow, which consists of a hollow plug H, with a perforation $1^H$ at the water-level, and a handle $2^H$, which is made of wood or some other non-conductor of heat. When the tank is to be emptied, the plug H is moved bodily. As such tanks have been in use for many years and are well known in the art, further description is believed to be unnecessary. Centrally located in this tank is a funnel or receptacle B. This funnel has a cylindrical upper portion $1^B$, a conical intermediate portion $2^B$, and a threaded nipple $3^B$ for its lower portion. The nipple $3^B$ is screw-threaded into the distributer C at $1^C$, and in the vertical walls $2^C$ of this distributer are secured radial pipes $3^C$, whose outer ends terminate adjacent to the bottom edges. The conical part $2^B$ is provided with inwardly-projecting and radial webs $4^B$, which terminate in a collar $5^B$, in which is screwed or otherwise suitably secured a nozzle D. The nozzle D is connected by a pipe $1^D$ and a valve $2^D$ with any suitable source of steam, as a boiler. A jam-nut $3^D$ secures the nozzle against the collar $5^D$. A water or liquid pipe E, with a valve $1^E$, connected to any suitable source of water-supply, terminates over the funnel B and adjacent to the pipe $1^D$. Slightly above the webs $4^B$ the funnel is provided with a collar $6^B$, on which rests an upwardly and inwardly inclined filter or strainer F, which is provided with a central opening $1^F$, through which the pipe $1^D$ passes. This strainer F may be located at any convenient place in the funnel B.

A two-part cylindrical strainer G or sieve fits the part $1^B$ of the funnel and extends throughout the length of this part. This filter or strainer G comprises a conical and perforated bottom $1^G$ $2^G$, surrounded by cylindrical vertical walls $3^G$ $4^G$ and vertical radial walls $7^G$ $8^G$. The radial walls $7^G$ are provided with a turned-over flange $9^G$, which are adapted to cover the upper edges of the radial walls $8^G$ when the strainer is in place in the funnel. The cylindrical walls $3^G$ $4^G$ are provided at their upper extremities with downwardly and inwardly extending flanges $10^G$ and $11^G$ and also with protruding handles $12^G$ and $13^G$. For convenience I have shown the strainer G divided into two parts. It is obvious that it may be divided into any number desired, as may be convenient.

The distributer C, with its radial pipes $3^C$, is centrally placed on the bottom of the tank A. The funnel B is secured to the joint C by means of the nipple $3^B$. The nozzle D is then put in place and turned until its lower end is the proper distance from the funnel B, and then the nozzle is held securely in place by means of the jam-nut $3^D$ and the screen or sieve F is put in place. The nozzle D is then connected by the pipe $1^D$ to any suitable source of steam-supply. The divided strainer G is then put in place in the funnel B, the part with the partition $8^G$ being first put in position, and the water-pipe E is then placed thereover. The bottom of the strainer G and the conical portion of the funnel $2^B$ slope in different directions, so they are oppositely disposed.

When the apparatus is to be put in use, assuming the tank to be empty, the water or other liquid and steam are turned on together and commingled at the nipple $3^B$, and the liquid is positively moved or forced by the steam when it passes out through the pipes $3^C$. This continues until the level of the water is slightly above the top of the funnel B, when it is shut off, and the steam continues to heat the water and send it with some force against the outer walls of the tank. This water then rises to the surface at the edges and then flows to the upper edge of the funnel, whence it passes over the flanges $10^G$ and $11^G$, through the strainers G and F, and thence out through the pipes $3^C$, the velocity and force with which this circulation takes place depending on the amount of steam admitted. When the mat is immersed in hot water, podgum fur and hair are detached therefrom and float to the surface. These impurities are carried by the surface currents to the funnel B, where they are left in the strainers G and F, so that when the mat leaves the water it will be entirely free from this objectionable fur and hair. From time to time as the fur and hair accumulate in the sieves or strainers they may be removed for cleaning and replaced with no expense and delay. As the water with the podgum-fur falls on the conical wall of the strainer $2^G$ the fur is washed to the bottom of the strainer $2^G$ and the wall $4^G$, so that the upper perforations are kept clear of this objectionable fur. This makes the strainer self-cleaning and produces a result which would be impossible if the walls of the strainer were made vertical, as in this case the hair would soon cover the perforations and clog the apparatus.

I have found by actual practice that my invention as above described will preserve the water free from all podgum fur and hair, so that the water may be used indefinitely without emptying and cleaning the tank unless dyes are used, in which case the tank must be emptied and cleansed whenever necessary to eliminate the effects of the dyes. As the water in the tanks, except for the podgum fur and hair, improves with use, my means for getting rid of this objectionable fur and hair is a great improvement over the common practice in this art, which is to drain the water off every day and clean the tank and then refilling the tank with fresh cold and unused water.

From this description it is obvious that the liquid below the surface and a little removed from the walls of the tank will be comparatively still, so that the mat is plunged into quiet water except when for an instant it comes into contact with the surface currents.

In the above I have shown and described the best embodiment of my invention known to me. However, many other forms may be employed, all of which are within the scope of my invention; nor is it necessary that my entire process be used, as a part for some purposes may be utilized with great advantage, such as the means or process for filtering the liquid at its upper surface, by causing it to pass through a strainer within the liquid mass. This is a very different process from the well-known one of pouring a liquid through a strainer or similar device.

Having described my invention, what I claim is—

1. In an apparatus of the class described, comprising means for causing converging surface currents in a liquid mass, positively-acting means for forcing said currents to move downwardly in said liquid mass, and means for removing the suspended or floating fur on the downward movement.

2. Inspirating means for causing surface currents in a liquid mass to remove fur therefrom, means for causing said currents to flow downwardly to a point within the liquid mass, and means for removing the fur from the liquid on said downward movement.

3. Means for causing surface currents in a liquid mass, means for straining out impurities from said currents and positively-acting means for forcing said strained currents to the outer and lower portion of the mass.

4. Means for causing surface currents in a liquid mass, centrally-located means for straining said currents, positively-acting means for forcing the strained liquid to the outer and lower extremities of the mass, and means for guiding from the said extremities to the upper surface of the liquid thus leaving undisturbed a large portion of the liquid mass.

5. In a podgum fur and hair removing apparatus, a funnel containing an inspirator and sieves.

6. In a podgum fur and hair removing apparatus, a funnel containing an inspirator and sieve concentrically located therein.

7. In a podgum fur and hair removing apparatus, a funnel provided with centrally-located conical sieves, said funnel and sieves being oppositely disposed.

8. In a podgum fur and hair removing apparatus, a funnel, sieves located therein, one of said sieves being divided into two parts on a plane passing through the axis of the funnel.

9. In a podgum fur and hair removing apparatus, a funnel, sieves located therein, one of said sieves being divided into similar parts by radial planes passing through the axis of the funnel.

10. As an article of manufacture, a sieve provided with a perforated conical bottom which is substantially one-half of a frustum of a cone of revolution, and vertical sides bounding said bottom.

11. As an article of manufacture, a sieve provided with an upwardly and inwardly disposed conical and perforated bottom which is substantially a fraction of a frustum of a cone of revolution bounding said bottom.

12. As an article of manufacture, a sieve provided with an upwardly and inwardly disposed conical and perforated bottom, which is substantially a fraction of a frustum of a cone of revolution, vertical walls inclosing said bottom, and handles on said vertical walls.

13. As an article of manufacture, a sieve provided with an upwardly and inwardly disposed conical and perforated bottom which is substantially a fraction of a frustum of a cone of revolution, vertical walls inclosing said bottom, and downwardly and inwardly disposed flanges at the upper edge of one of said walls.

14. As an article of manufacture, a cylindrical sieve with perforated and conical bottom, said sieve being divided into distinct and integral parts by radial partitions passing through the axis of said cylinder, certain of which vertical partitions being provided with overlapping edges which are adapted to engage and cover the upper edges of the other partitions.

15. In a podgum fur and hair removing apparatus, a funnel, sieves located therein, and an inspirator concentric with said sieves, and radial pipes connected to the funnel at its lower end.

16. In a podgum hair and fur removing apparatus, a tank, a contracted receiver located therein, a conical strainer located therein, and means for causing said liquid to pass through said strainer.

17. In a podgum hair and fur removing apparatus, a tank, a contracted receiver located therein, a strainer in said receiver, and means for passing liquid from the top of the tank through said receiver and strainer, and thence to the bottom edges of the tank.

18. In a fur and hair removing apparatus, an inspirator, a funnel, and self-cleansing means for separating water from fur in said funnel.

19. In a podgum-fur-removing apparatus, an inspirator, a funnel connected therewith, and a conical sieve in said funnel for separating the podgum-fur from the liquid which passes through the said funnel.

20. In a podgum fur and hair removing apparatus, a funnel, sieves located in said funnel, a steam-pipe with an adjustable nozzle which forms an inspirator with a portion of said funnel.

21. In a podgum-fur-removing apparatus, a funnel, radial webs extending from the interior of said funnel, a screw-threaded collar uniting said webs, sieves located in said funnel, and a steam-pipe with an adjustable nozzle engaging said collar.

22. In a podgum-fur-removing apparatus, a funnel, radial webs in the interior thereof with a screw-threaded collar uniting said webs, sieves, a steam-pipe with an adjustable nozzle engaging said collar, and a jam-nut on said nozzle.

23. In a podgum-fur-removing apparatus, a funnel, sieves located in said funnel, a steam-pipe with an adjustable nozzle which forms an inspirator with a portion of said funnel, and a distributer.

24. In a podgum-fur-removing apparatus, a funnel, a divided sieve in said funnel, and a steam-pipe with an adjustable nozzle which forms an inspirator with a portion of said funnel.

25. In a podgum-fur-removing apparatus, a funnel with a cylindrical upper portion, and a strainer with a cylindrical wall and conical bottom fitting said cylindrical upper portion, and a steam-pipe with a nozzle which forms an inspirator with a portion of said funnel.

Signed in the city, county, and State of New York this 12th day of March, 1903.

WILLIAM HUPCHEN.

Witnesses:
JAMES M. MITCHELL,
O. E. EDWARDS, Jr.